United States Patent [19]

Vasudevan et al.

[11] Patent Number: 5,678,040
[45] Date of Patent: Oct. 14, 1997

[54] METHOD FOR MANAGING A HIERARCHICAL DESIGN TRANSACTION

[75] Inventors: Venu Vasudevan, Mesa; Dhiraj Kumar Gossain, Phoenix; Dana Mark Rigg, Chandler, all of Ariz.; Don Michael Gibson; Tron Kyle Womack, both of Austin, Tex.

[73] Assignee: Motorola, Inc., Schaumburg, Ill.

[21] Appl. No.: 759,339

[22] Filed: Dec. 2, 1996

Related U.S. Application Data

[63] Continuation of Ser. No. 143,040, Oct. 29, 1993, abandoned.

[51] Int. Cl.$^6$ .................................................. G06F 15/00
[52] U.S. Cl. ...................... 395/608; 395/610; 395/614; 395/615; 395/617; 395/619
[58] Field of Search .................................. 395/608, 615, 395/610, 617, 619, 614

[56] References Cited

U.S. PATENT DOCUMENTS

| | | | |
|---|---|---|---|
| 4,823,310 | 4/1989 | Grand | 395/608 |
| 4,875,159 | 10/1989 | Cary et al. | 395/619 |
| 5,063,501 | 11/1991 | Jordan, Jr. | 395/726 |
| 5,097,414 | 3/1992 | Tone | 395/444 |
| 5,123,104 | 6/1992 | Levine et al. | 395/601 |
| 5,212,788 | 5/1993 | Lomet et al. | 395/617 |
| 5,280,612 | 1/1994 | Lorie et al. | 395/608 |
| 5,287,496 | 2/1994 | Chen et al. | 395/619 |
| 5,301,290 | 4/1994 | Tetzlaff et al. | 395/469 |
| 5,313,629 | 5/1994 | Abraham et al. | 395/614 |
| 5,317,731 | 5/1994 | Dias et al. | 395/618 |
| 5,333,316 | 7/1994 | Champagne et al. | 395/608 |
| 5,355,477 | 10/1994 | Strickland et al. | 395/608 |
| 5,377,351 | 12/1994 | Kotera et al. | 395/608 |

*Primary Examiner*—Thomas G. Black
*Assistant Examiner*—Jean R. Homere
*Attorney, Agent, or Firm*—Rennie William Dover

[57] ABSTRACT

A hierarchical design transaction method which provides a shared project workspace and an individual user workspace. A desired portion of a hierarchical design is checked out from the shared project workspace and is edited in the individual user workspace. A new version of the desired portion of the hierarchical design is checked into the shared project workspace. Concurrently, another individual user workspace is provided, and another desired portion of the hierarchical design is checked out, edited and checked in. These steps are repeated for each of a plurality of desired portions of the hierarchical design, to continuously guarantee consistency between the shared project workspace and each individual user workspace.

9 Claims, 3 Drawing Sheets

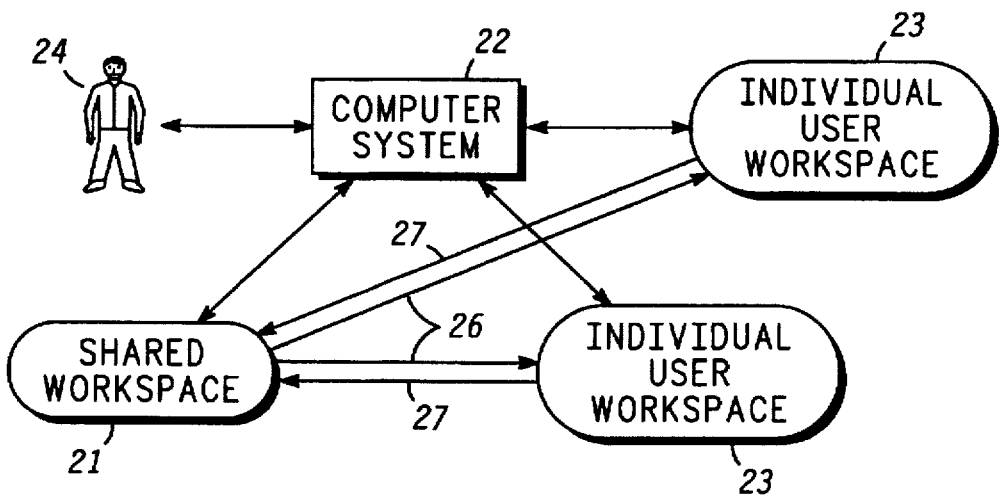
FIG. 1
FIG. 3
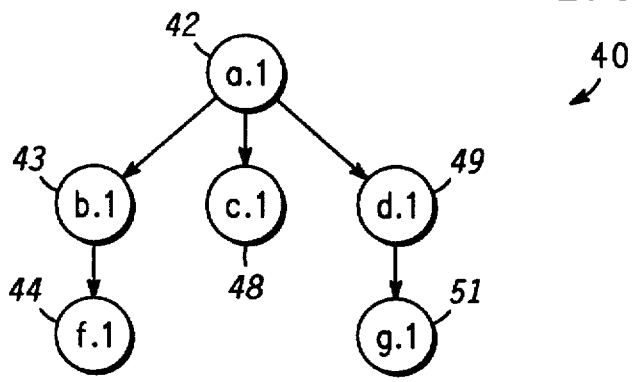
FIG. 4
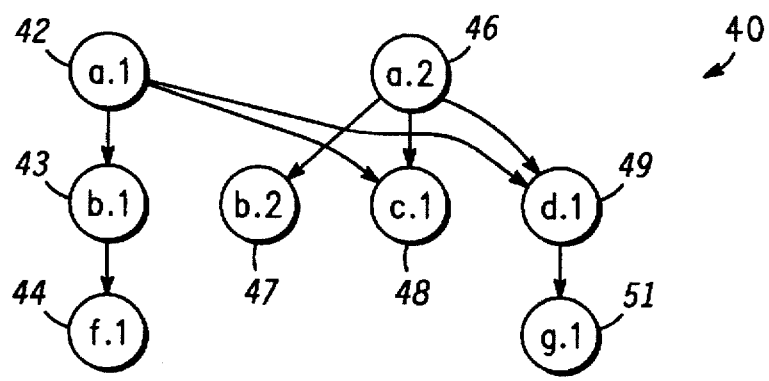

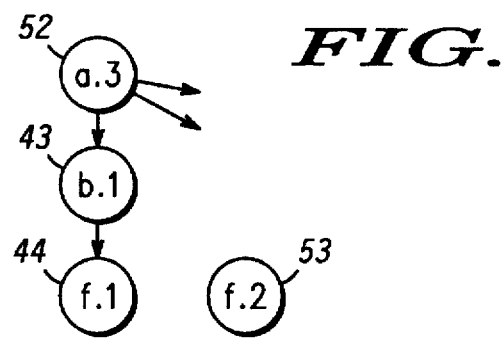
FIG. 5
FIG. 6
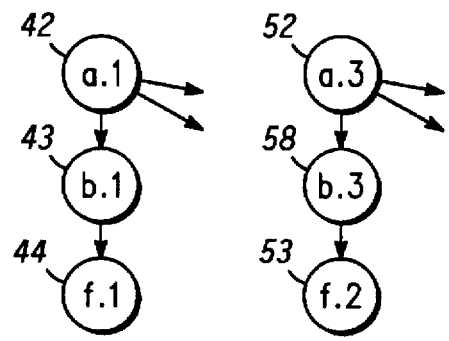
FIG. 7
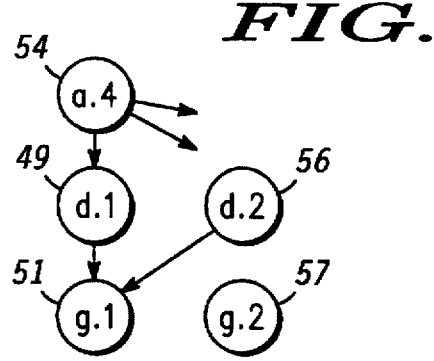
FIG. 8
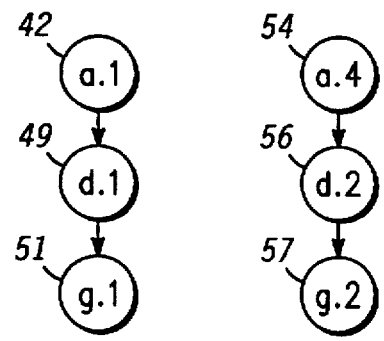

METHOD FOR MANAGING A HIERARCHICAL DESIGN TRANSACTION

This application is a continuation of prior application Ser. No. 08/143,040, filed Oct. 29, 1993, now abandoned.

BACKGROUND OF THE INVENTION

The present invention relates, in general, to product design, and more particularly to management of a complex hierarchical design.

The complexity of typical designs for new products is such that the information specifying that product is divided into a hierarchical format. This hierarchy consists of high level blocks which perform complex functions and are interconnected to produce the desired function. Each of these high level blocks is then further subdivided into less complex functions and the process is repeated until a desired lowest level of functionality is achieved. The lowest level of functionality defined is dependent on the particular technology being used for the product. For example when designing a VLSI integrated circuit, the top level description is typically the entire VLSI integrated circuit. Successive blocks within the integrated circuit are designed using still smaller sub-blocks which may comprise basic functions such as AND, OR, XOR. Alternatively, intermediate level functions such as adders, shift registers, or memories may be used. In some cases this hierarchy may extend to individual transistors or special purpose devices such as light sensors or light emitters. Using a hierarchical description of the desired product implies that the hierarchy, that is, the relationship between each element, is as important as the internal definition of the elements themselves. If an element such as a shift register were connected to the incorrect device then the product would not work just as surely as if an incorrect part were used.

A complex design such as a VLSI integrated circuit typically requires the coordinated efforts of many individual designers. It is not unusual for one hundred or more designers to work on a single project. Accordingly management and coordination of these efforts is itself a complex and challenging problem. Each designer must be allowed to work freely on an assigned portion of the total design while at the same time ensuring that the work product of any two designers does not conflict. This is typically achieved by using a design management computer which maintains a central project workspace in the computer memory. This project workspace reflects the current status of the design as it proceeds from conception to completion. Typically whenever an individual designer desires to work on a cell within the design, a formal check-out process is performed. The term check-out is used herein to describe check-out for edit capability. This process allows the designer to copy that cell into a private user workspace for modification. Typically rules are implemented which allow only one designer to check-out a cell for edit at any one time. Upon completion of the desired changes, a formal check-in procedure is used to add the changed cell to the shared project workspace and release the new cell for use by other designers.

Commercial products typical of the prior art include the OPUS system produced by Cadence, Inc. and the FALCON System produced by Mentor Graphics. These data management systems support check-in and check-out of items from a common shared project workspace thus ensuring the integrity of each individual cell. However these design systems do not manage the relationship between individual cells. The designer must manually check-out or check-in related cells correctly to maintain the integrity of the entire design. Thus it is possible to have a new version of a root level cell with older versions of sub-cells which create errors in the overall design reflected in the shared project workspace. Unless these errors are themselves corrected by manual intervention of the designers an inoperative design can result. There is a need for a design transaction management system which will allow designers to manipulate a hierarchy of related items as a unit. This system must allow both editing and read only access to any portion of the design while guaranteeing integrity of the current version in shared project workspace at all times. Both the versions of items themselves which are referred to by higher level cells and the relationship between those items must be maintained. A method is required which will allow upgrading of an item from read only status to edit status so that a designer can make desired changes in a portion of the design without a long, involved, and error prone procedure. The management system should be suited for a large number of designers to work in parallel on a large complex design without creation of errors or excessive time spent in data management operations.

BRIEF DESCRIPTION OF THE DRAWINGS

FIG. 1 shows a schematic drawing of a computer system having memory divided into a shared workspace and individual user workspaces;

FIG. 3 shows a schematic drawing of the contents of a computer memory containing a typical hierarchical design; and FIGS. 4-8 show schematic drawings of typical design transactions which are useful in understanding the present invention.

DETAILED DESCRIPTION OF THE DRAWINGS

Figure 2:
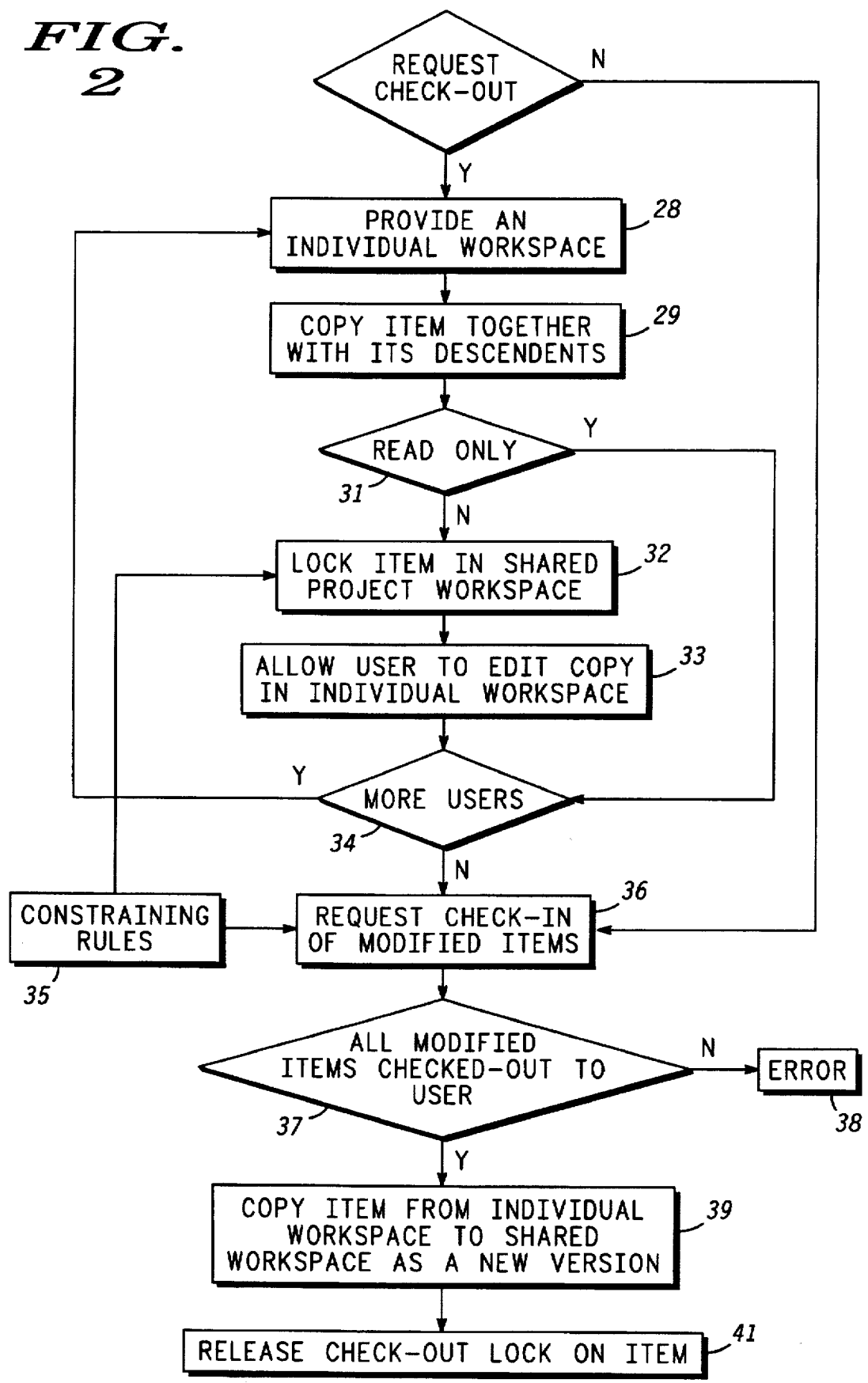
FIG. 2 shows a flow chart of a hierarchical design transaction method.

FIG. 1 shows a schematic drawing of a computer system having a shared project workspace 21 and a plurality of individual user workspaces 23 stored in the memory of a computer system 22. Shared project workspace 21 and individual user workspaces 23 are manipulated by computer system 22. For clarity the normal components of a computer system such as disk storage, displays, and printers are not shown, however it will be understood by those of skill in the art that computer system 22 will include all necessary components. Frequently, computer system 22 will actually be a plurality of computers closely tied by a network. For simplicity only a single system is shown since such networked operation of computers is well known. Computer system 22 is used to perform all manipulations on shared project workspace 21 as well as individual user workspace 23 in accordance with coded instructions stored within the computer memory. Among the operations performed by computer system 22 is a check-out procedure 26 and a check-in procedure 27 which creates copies of desired portions of a hierarchical design stored in shared project workspace 21 and stores those copies in a desired individual user workspace 23. Computer system 22 is also used to modify, create, and delete items from within individual user workspace 23 at the direction of a human designer 24. Since the computer system shown in FIG. 1 is used throughout this description, references to these numbered objects will refer to FIG. 1 as required.

FIG. 2 shows a flow chart which summarizes a preferred embodiment of a hierarchical design transaction method in accordance with the present invention. The steps of the flow chart of FIG. 2 are typically performed by computer system 22 whenever a check-out 26 or check-in 27 as shown in FIG. 1 is required. For simplicity the operation of check-out 26 is shown before the operation check-in 27, however these two operations may be performed in any order required by the particular circumstances. For check-out 26, computer system 22 (FIG. 1) will provide an individual user workspace 28. Typically individual user workspace 23 (FIG. 1) is a predefined area of computer memory which is devoted to a particular designer 24.

For simplicity the hierarchical design is described in terms of items which refer to descendent items in a hierarchical tree. An "item" is defined as a uniquely identified grouping of information which is manipulated as a unit by computer system 22. These items may also be termed objects, cells, or groups in various embodiments of the present invention. A copy 29 of the desired item together with related items which are descendents in the hierarchical tree is made by copying these items from shared project workspace 21 to the individual user workspace 23. To ensure consistency of versions within individual user workspace 23, it is necessary to completely delete any existing version of the hierarchical design from individual user workspace 23 before the step of checking out a new version of the hierarchical design. Only those items which are required are copied, subject to constraining rules 35 which are set forth in more detail later. If the check-out request is for read only i.e., decision diamond 31 is yes (Y), then the check-out procedure is completed and proceeds to test for more users 34 below. For an editing request in which read only decision diamond 31 is negative, the item is locked 32 in shared project workspace 21. This means that further check-out of these items is inhibited so as to prevent more than one person from modifying an item simultaneously. However the remaining items stored in shared project workspace 21 were not locked by this action and may be checked-out by other designers. In this way modifications may be performed on many items by many designers simultaneously.

Now the user is allowed 33 to edit the copy in user workspace 23. A test 34 is made for more user check-out requests and the check-out process 26 may be repeated as often as required. This allows many designers 24 (FIG. 1) to simultaneously work on different portions of the total design provided no two designers 24 attempt to alter the same portion of the overall design. However, all designers 24 can refer to an item in read only mode. That is to say, all designers can display and examine any item without being allowed to modify the item unless that item is checked-out to them. Likewise the relationships between items can only be modified when all items which could be affected are checked out, this implies that they must form a single sub-tree hierarchy. When all desired changes are completed, the user may request check-in of modified items 36. A check 37 is performed to ensure that all items which are to be checked in were previously checked out to that designer 24. If this is not true then an error condition 38 is generated. Otherwise a copy 39 is performed to copy each individual item from individual user workspace 23 into shared project workspace 21 as a new version of that item. Next the check-out lock is released 41 for that item.

To continuously guarantee consistency between shared project workspace 21 and each individual user workspace 23, both check-out 26 and check-in 27 must follow constraining rules 35 which are outlined herein. It should be understood that constraining rules 35 set forth herein are not exhaustive but are intended as illustrative examples.

FIG. 3 shows a schematic drawing of the relationships between items of a hierarchical design 40 which is a simplified example of a design typical of those managed by a preferred embodiment in accordance with the present invention. For clarity, a convention has been used wherein an item comprising a group of closely related information is designated by a letter enclosed within a circle. A numeric designator is used to designate a particular revision of that item. In the example illustrated by FIG. 3 all of the items are cells which are the original revisions, that is they have a suffix "1". A root cell 42 represents the highest level of the hierarchy of this particular portion of the design. In accordance with the convention adopted cell 42 is designated as a "a.1" Cell 42 refers to three sub-cells, that is cells 43, 48, and 49. In turn cell 43 refers to a sub-cell 44, and cell 49 refers to a sub-cell 51. Cells 44, 48, and 51 do not refer to any lower level cells and hence are termed "leaf cells".

FIG. 4 shows a schematic drawing of hierarchical design 40 without cell 42 (FIG. 3). Since more than one individual workspace 23 may refer to the contents of shared project workspace 21, including cell 42, actual deletion of cell 42 in shared project workspace 21 is not permitted. Instead a new version of hierarchical design 40 starting with a new root cell 46 (designated as "a.2") is created. Cell 46 then refers to cell 47 (designated as "b.2"), which now contains no reference to cell 44. Accordingly version 2 of hierarchical design 40 no longer contains cell 44. However, version 1 of hierarchical design 40 begins a hierarchy starting with a cell 42 which is unchanged, allowing use of version 1 if desired. Users who were referring to cells 42, 43, or 44 in a read only mode may continue to do so for as long as required, but a user who simply requests access to hierarchical design 40 will now access cell 46 and the descendent cells from cell 46 as a hierarchy. Accordingly it is seen that deletion of a cell 44 from the design does not cause physical removal of that cell from shared project workspace 21, rather such a deletion causes a new hierarchy to be constructed which does not contain the deleted cell.

FIG. 5 shows a schematic drawing of hierarchical design 40 (FIG. 3) in which cells were modified and incorrectly restored to shared project workspace 21. For clarity only that portion of the hierarchy which is changed will be shown although it should be understood that all previous versions of every cell will still be found in the shared project workspace 21. In this example cell 42 and cell 44 were copied to an individual user workspace 23 and modifications were made to those two cells. Cell 43 was not changed and hence was not copied to individual user workspace 23. Upon check-in of these cells a new version of each is created. Cell 42 becomes 52 designated as "a.3" and cell 44 becomes cell 53 designated as "f.2". The contents of cell 43 were not changed by the user and hence cell 43 remains unchanged in shared project workspace 21. As a result cell 43 still refers to the information in cell 44 rather than the new information in cell 53. Accordingly it is necessary to create a new cell 58 as shown in FIG. 6 whose only function is to refer to the new cell 53 containing the new information.

FIG. 6 illustrates the desired and correct implementation of the hierarchical design 40 (FIG. 3) which is shown incorrectly modified in FIG. 5. A new version is created which begins with cell 52 and includes cell 52, cell 58 and cell 53. In the preferred embodiment this is accomplished by forcing a user to check out all cells in the hierarchy starting with cell 42 (FIG. 3) and all dependent cells including leaf cells and intermediate cells. In the example shown in FIG. 3 this would include cells 43, 44, 48, 49, and 51. Upon check-in cell 43 is altered to become a new version of cell 43, that is cell 58 designated as "b.3". Note that cell 43 is not designated as "b.2" since cell 47 (FIG. 4) has already used this designation. This also implies that the desired portion of the hierarchical design which is checked-out must be restricted to those items which form a single sub-tree hierarchy. A sub-tree hierarchy is a hierarchy which is restricted to a sub-set of the related items from the full hierarchy, having a single root with all elements descending from that single root.

Another example of a constraining rule 35 is illustrated when a user checks-out cell 42 for edit with cells 43, 44, 48, 49, and 51 (FIG. 3) as read only. This is typically done so that the internal information within cells 43, 44, 48, 49, and 51 may be displayed, but since no changes to these cells are anticipated other designers 24 are allowed to edit them. If designer 24 subsequently desires to edit a read only cell such as cell 44 it is necessary to promote the mode of all intermediate cells to edit mode as well so as to reflect the new relationships between cells 42, 43, and 44 when they are checked-in as cells 52, 58, and 53 respectively. In the present example this requires that both cell 44 and cell 43 must be checked-out for editing. In general, promoting an item requires that all references between the item and the sub-tree already present in the individual user workspace also be promoted to the edit mode.

FIG. 7 shows a schematic drawing of the hierarchical design 40 (FIG. 3) in which cells 42, 49, and 51 (FIG. 3) were checked-out, modified, and then checked-in using an incorrect ordering. This situation occurs if the modified cell 42, and new cell 54 designated as "a.4" is checked-in before new cells 56 and 57. When new cell 54 is checked into shared project workspace 21 it must refer to cell 49 since this is the most recent version of the item designated as "d". So 56 is next checked in and refers to old cell 51. Finally cell 57 is checked in and designated as "g.2". This error condition results in cells 56 and 57 being unused by any higher level cells. Cells 56 and 57 thus exist in shared project workspace 21 but are unusable. As a result the design modifications made to hierarchical design 40 which should have been reflected in new cell 54 are lost.

FIG. 8 illustrates shared project workspace 21 when new cells 54, 56, and 57 are checked in starting with the lowest or leaf cells first. In this example cell 57 is a leaf cell which does not refer to another cell and so is checked-in first. Cell 56 is checked in and finds cell 57 to which it refers. Next cell 54 is checked-in and finds cell 56 to which it refers. For clarity the unchanged references to cells 43, 48, and indirectly to cell 44 are not shown but would be included with cell 54 in the same way as illustrated for cell 42 in FIG. 1. Thus it is necessary to ensure that cells are checked-in using an ordering which starts with the lowest level leaf cells and proceeding to check-in a top level or "root" which creates a new version whenever changes are made within hierarchical design 40. Accordingly the new version of the desired portion of the hierarchical design is itself a sub-hierarchy consisting of a root item and several descendent leaf items and intermediate items which are descendent from the root but themselves have descendents. The step of checking in the root item will thus require that all items which are descendent from the root item are checked in before the root item itself is checked in. The step of checking in the root item thus creates a new version of the subtree in the shared project workspace.

By now it should be clear that the present invention provides a design transaction management system which will allow designers to manipulate a hierarchy of related items as a unit. This system allows both editing and read only access to any portion of the design while guaranteeing integrity of the current version in shared project workspace at all times. Both the versions of leaf-cells which are referred to by higher level cells and the relationship between items are maintained. A method is presented which will allow upgrading of an item from read only status to edit status so that a designer can make desired changes in a portion of the design without a long, involved, and error prone procedure. The management system is suited for a large number of designers to work in parallel on a large complex design without unnecessary creation of errors or excessive time spent in data management operations.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A hierarchical design transaction method, comprising the steps of:

providing a first region of a computer memory which is identified as a shared project workspace and which contains a first version of a hierarchical design stored therein;

providing a second region of computer memory which is designated as an individual user workspace;

providing a second version of the hierarchical design in the shared project workspace;

checking out a desired portion of the hierarchical design from the shared project workspace by copying the desired portion of the hierarchical design into the individual user workspace;

editing the desired portion of the hierarchical design in the individual user workspace;

checking in a new version of the desired portion of the hierarchical design into the shared project workspace to continuously guarantee consistency between the shared project workspace and each individual user workspace, while maintaining both the second version of the hierarchical design and the relationships between the new version and the second version of desired portion of the hierarchical design in the shared project workspace; and guaranteeing the internal consistency of the shared project workspace at all times.

2. The hierarchical design transaction method of claim 1 wherein guaranteeing the internal consistency of the shared project workspace comprises disallowing changes to previously checked in items such that the shared project workspace must grow as changes are made.

3. A hierarchical design transaction method, comprising the steps of:

providing a first region of a computer memory which is identified as a shared project workspace and which contains a hierarchical design stored therein;

providing a second region of computer memory which is designated as an individual user workspace;

providing a first version of a hierarchical design in the individual user workspace;

providing a second version of the hierarchical design in the shared project workspace;

checking out a desired portion of the hierarchical design from the shared project workspace by copying the desired portion of the hierarchical design into the individual user workspace; editing the desired portion of the hierarchical design in the individual user workspace;

checking in a new version of the desired portion of the hierarchical design into the shared project workspace to continuously guarantee consistency between the shared project workspace and each individual user workspace, while maintaining both the second version of the hierarchical design and the relationships between the new version and the second version of desired portion of the hierarchical design in the shared project workspace; and completely deleting the first version of the hierarchical design from the individual user workspace before the step of checking out the second version of the hierarchical design.

4. A hierarchical design transaction method, comprising the steps of:

providing a first region of a computer memory which is identified as a shared project workspace and which contains a hierarchical design stored therein;

providing a second region of computer memory which is designated as an individual user workspace;

checking out a desired portion of the hierarchical design from the shared project workspace by copying the desired portion of the hierarchical design into the individual user workspace;

editing the desired portion of the hierarchical design in the individual user workspace; and checking in a new version of the desired portion of the hierarchical design into the shared project workspace to continuously guarantee consistency between the shared project workspace and each individual user workspace, while maintaining both the hierarchical design stored in the shared project workspace and the relationships between the new version of the desired portion of the hierarchical design and the hierarchical design stored in the shared project workspace, wherein the new version of the desired portion of the hierarchical design comprises a sub-hierarchy comprising a root item and at least one leaf item and further wherein the step of checking in the root item requires that all items that are descendent from the root item are checked in before the root item itself is checked in.

5. The hierarchical design transaction method of claim 4, wherein the root item is itself a descendent of a higher level item and the step of checking in the root item creates a new version of the subtree in the shared project workspace.

6. The hierarchical design transaction method of claim 5, further comprising:

providing an item which is only read by an individual user workspace;

subsequently checking out the item into the individual user workspace; and promoting the item from a read only mode to an edit mode in such a way as to allow editing of the item in the individual user workspace.

7. The hierarchical design transaction method of claim 6, wherein promoting of an item requires that all references between the item and the sub-tree already present in the individual user workspace are also promoted to the edit mode.

8. A hierarchical design transaction method, comprising:

providing a first region of computer memory which is identified as shared project workspace and which contains a hierarchical design stored therein;

providing a second region of computer memory which is designated as an individual user workspace;

identifying a plurality of individual items within the shared project workspace which can be manipulated individually;

providing a first version of the hierarchical design in the individual user workspace;

providing a second version of the hierarchical design in the shared project workspace;

checking out individual items from the shared project workspace by copying a desired portion of the hierarchical design into the individual user workspace;

locking individual items within the shared project workspace so as to guarantee that only one edit is performed on an item at any time, while still allowing concurrent read only access to the item;

editing the desired portion of the hierarchical design in the individual user workspace;

checking in a new version of the desired portion of the hierarchical design into the shared project workspace; and concurrently repeating the steps of providing a second region of computer memory, checking out a desired portion of the hierarchical design, editing the desired portion of the hierarchical design, and checking in a new version of one desired portion of the hierarchical design for each of a plurality of desired portions of the hierarchical design, in such a way as to continuously guarantee consistency between the shared project workspace and each individual user workspace, including completely deleting the first version of the hierarchical design from the individual user workspace before the step of checking out the second version of the hierarchical design, and in addition guarantee the internal consistency of the shared project workspace at all times.

9. A hierarchical design transaction method, comprising:

providing a first region of computer memory which is identified as shared project workspace and which contains an hierarchical design stored therein;

providing a second region of computer memory which is designated as an individual user workspace;

identifying a plurality of individual items within the shared project workspace which can be manipulated individually;

checking out individual items from the shared project workspace by copying the desired portion of the hierarchical design into the individual user workspace;

restricting the individual items which may be checked out to items which form a single sub-tree hierarchy within the design;

locking individual items within the shared project workspace so as to guarantee that only one edit is performed on an item at any time, while still allowing concurrent read only access to the item;

editing the desired portion of the hierarchical design in the individual user workspace while restricting changes in the relationships between items to those items which are checked out for edit;

checking in a new version of the desired portion of the hierarchical design into the shared project workspace wherein the new version of the desired portion of the hierarchical design comprises a sub-hierarchy comprising a root item and at least one leaf item and further wherein the step of checking in the root item requires that all items are descendent from the root item are checked in before the root item itself is checked in; and concurrently repeating the steps of providing a second region of computer memory, checking out a desired portion of the hierarchical design, editing the desired portion of the hierarchical design, and checking in a new version of one desired portion of the hierarchical design for each of a plurality of desired portions of the hierarchical design, in such a way as to continuously guarantee consistency between the shared project workspace and each individual user workspace, and in addition guarantee the internal consistency of the shared project workspace at all times.

* * * * *

UNITED STATES PATENT AND TRADEMARK OFFICE
CERTIFICATE OF CORRECTION

PATENT NO. : 5,678,040
DATED : October 14, 1997
INVENTOR(S) : Venu Vasudevan et al.

It is certified that error appears in the above-indentified patent and that said Letters Patent is hereby corrected as shown below:

In Claim 3, column 7, lines 3-4, after "workspace;", insert --editing the desired portion of the hierarchical design in the individual user workspace;--

Signed and Sealed this

Eleventh Day of August 1998

Attest:

BRUCE LEHMAN

*Attesting Officer*   *Commissioner of Patents and Trademarks*